United States Patent [19]

August

[11] Patent Number: 4,759,323
[45] Date of Patent: Jul. 26, 1988

[54] COMBUSTION ENGINE WITH ONE OR MORE "SQUISH" SPACES BETWEEN THE PISTON AND THE CYLINDER HEAD

[75] Inventor: Paul August, Barcelona, Spain

[73] Assignee: Glotur Trust Reg., Fed. Rep. of Germany

[21] Appl. No.: 840,633

[22] Filed: Mar. 17, 1986

[30] Foreign Application Priority Data

Dec. 20, 1985 [DE] Fed. Rep. of Germany ....... 3545504

[51] Int. Cl.[4] .............................................. F02F 3/28
[52] U.S. Cl. ................................... 123/193 P; 123/661
[58] Field of Search ............... 123/193 R, 193 P, 657, 123/661

[56] References Cited

U.S. PATENT DOCUMENTS

| | | | |
|---|---|---|---|
| 2,810,377 | 10/1957 | Weissenbach | 123/661 |
| 4,182,279 | 1/1980 | Sato et al. | 123/661 |
| 4,344,408 | 8/1982 | Inoue et al. | 123/661 |

FOREIGN PATENT DOCUMENTS

2751993  5/1979  Fed. Rep. of Germany ...... 123/661

Primary Examiner—Willis R. Wolfe, Jr.
Assistant Examiner—M. Macy
Attorney, Agent, or Firm—Alan H. MacPherson; Richard Franklin; Thomas S. MacDonald

[57] ABSTRACT

The combustion engine forms "squish" spaces between the piston and the cylinder head and has additional guide means in the combustion chamber which create a rotational flow in the combustion chamber. The floor of the combustion chamber is formed by a trough-shaped recess in the piston head, so that it forms a "squish" space extending over the complete width of the combustion chamber. In the area between the valves, a further, central "squish" space extends which, in conjunction with the wall of the cylinder head which is situated above it, forms a further "squish" space flow which reinforces the lateral "squish" space flow. In this way the ignition timing can be further retarded and the temperature peak reduced together with an additional reduction in emissions of oxides of nitrogen. A very weak mixture with an excess of air of 30% or more can be ignited which likewise maintains a low burning temperature thus producing less nitrous oxide. The emission of carbon monoxide, as a result of the weak mixture, is also low, and the hydrocarbon emissions are minimal due to the total combustion by means of rotation of gases in the combustion chambers. Test results show a reduction in fuel consumption between 15% and 20% when compared with current engines.

8 Claims, 4 Drawing Sheets

COMBUSTION ENGINE WITH ONE OR MORE "SQUISH" SPACES BETWEEN THE PISTON AND THE CYLINDER HEAD

BACKGROUND OF THE INVENTION

Systems and procedures are proposed for the detoxification of exhaust gas coupled with low fuel consumption which bring into play, in the case of the Otto motor, a weak mixture in rotation, in which, by means of this rotation the mixture rapidly reaches the spark plug thus ensuring better ignition and proper combustion. Very weak mixtures with a composition of Lambda 1.3 or less are therefore necessary so that not only the hydro carbons and carbon monoxide but also nitrogen content of the exhaust are very low.

A proposal from Ford and others is that, in the area of the inlet valves, by means of swirl-creating fittings, a spiral flow is created which continues in the combustion chamber up to the point of ignition. In the case of the continually-changing operating conditions of revolutions and performance, this system does not ensure correct ignition because the rotation cannot definitely be maintained in the compression cycle to the point of ignition and possibly breaks down before then so that the swirl is not maintained until the point of ignition.

As is known in DE 27 51 993 11, the "squish" space between the piston head and the corresponding wall of the cylinder head is so formed that near the top dead centre position of the piston at least one "squish" space flow is created in parallel to one wall of the combustion chamber so that this "squish" space flow in conjunction with the guide means arranged inside the combustion chamber results in a rotational flow. The spark plug is fitted in the area of the rotational flow so that even a very weak air-fuel mixture is enough for ignition.

BRIEF SUMMARY OF THE INVENTION

The invention is based on the technical problem of the further development of a combustion engine of the type mentioned in the introduction so that despite an even weaker air-fuel mixture, correct ignition an be achieved during all operating conditions of the motor.

To solve this technical problem, the invention is characterized in that in the space extending between the valves at least one centre "squish" space is arranged, which, in conjunction with the wall of the cylinder head situated above it, forms a further squish space flow reinforcing the lateral "squish" space flow.

A feature of the present invention is, therefore, that adjacent to the previously-known "squish" space flow, a further central "squish" space flow is created which is led directly onto the spark plug. In this way, in that the central "squish" space extends at least partially into the space between the valves, a greater "squish" path is created for the air-fuel mixture by this central "squish" space than as compared to the previously known "squish" space flow. The central "squish" space, therefore, continues the previously known "squish" space and achieves, in the centre of the combustion chamber, a rapid acceleration of the flow so that, seen over the width of the combustion chamber, a total of two lateral rotating flow vortices are created, in between which a faster rotating flow vortex is arranged which is created by the centre "squish" space. The faster rotation speed is additionally achieved in that the rotation space and path (distance between the leading edge of the "squish" space and the spark plug) is smaller than that of the lateral adjacent rotation spaces. By means of the differing speeds of rotation in the area of the spark plug in comparison to the neighbouring areas, the combustion process is, among others, accelerated in this way in that the flow vortices have differing speeds of rotation and the central vortex rotates faster than the neighbouring outer ones. In this way the slower rotating vortices to the left and right of the spark plug are laterally met by the faster vortices already ignited by the spark plug, in which the central vortex can be defined as an ignition jet which penetrates into the lateral slower vortices, swirling them so that they quickly and intensively mix with the ignition jet and burn through.

This achieves the advantage in that the combustion process even in the outer vortices takes place quicker because of the differing pressure ratios.

By means of the technical teaching according to the invention it is therefore possible to retard the point of ignition in comparison with current layouts which, in combination with the use of a weak air-fuel mixture, brings about an even further reduction of the emission of oxides of nitrogen.

In a first embodiment example of the present invention, it is provided that the central "squish" space is formed by a wedge-shaped guide projection on the piston head. It is preferred here that this guide protection continues the slope of the lateral mating "squish" spaces so that, seen over the width of the combustion chamber, a smooth transfer from the "squish" spaces into the combustion chamber is ensured.

In a further embodiment example of the present invention it is provided that a central "squish" space of a differing slope mates with the outer "squish" spaces, so that the vortices created by the outer long "squish" spaces are led at an angle over the centre "squish" space and subsequently flow into the combustion chamber.

Further features of the invention are the subject of the remaining sub-claims.

The subject matter of the present invention is defined by the Patent Claims individually and in combination.

In the following, by means of drawings illustrating several embodiment examples, the invention is further explained. In this way further essential features and advantages of the invention arise from the drawings and their descriptions.

DETAILED DESCRIPTION

Figure 1:
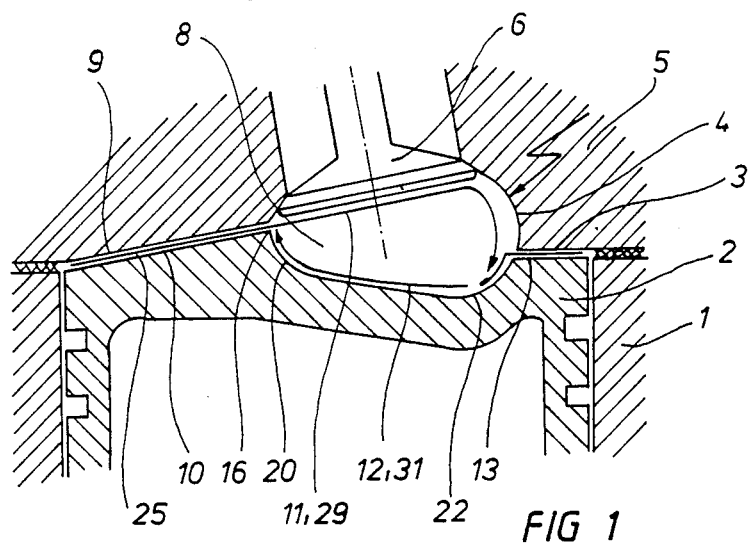
FIG. 1 is a section through a combustion chamber of a first embodiment example corresponding to the line C-D in FIG. 2.

In a cylinder (1) a piston (2) is arranged, and in the cylinder head (5) an inlet valve (6) and an outlet valve (7) are fitted. The combustion chamber (8) formed in the piston head (15) is formed by a trough-shaped recess (22) in the piston head (15) whereas the opposing side is formed by the slope (9) of the wall of the cylinder head (5). The cylinder head (5) has, on the inner side wall, a guide curve (4) which always passes over the trough-shaped recess (22) in the piston head (15). One side wall of the recess (22) is formed by a further guide surface (20) which itself, again, always passes over the upper wall of the cylinder head (5), so that they form together a trough-shaped combustion chamber (8) in which a rotating flow of the mixture is created as described in the following manner.

On one side of the firing chamber the piston (2) is formed with a slope (10) in the upwards direction which lies opposite to a parallel slope (9) of the cylinder head (5). These two opposing slopes (9)(10) form a "squish" space (25) whose opening is directed obliquely upwards in the combustion chamber so that the "squish" space flow (29) out of the "squish" space (25) runs roughly parallel to the undersides of the valves (6)(7) and to the upper wall of the cylinder head (5).

The "squish" space flow (29), after sweeping over the underside of the valves (6)(7) is diverted by the guide curve (4) and combines itself there with a smaller "squish" space flow from a "squish" space (13) formed on the right side wall of the cylinder which is likewise formed from the corresponding surfaces of the piston (2) and the cylinder (1).

Figure 3:
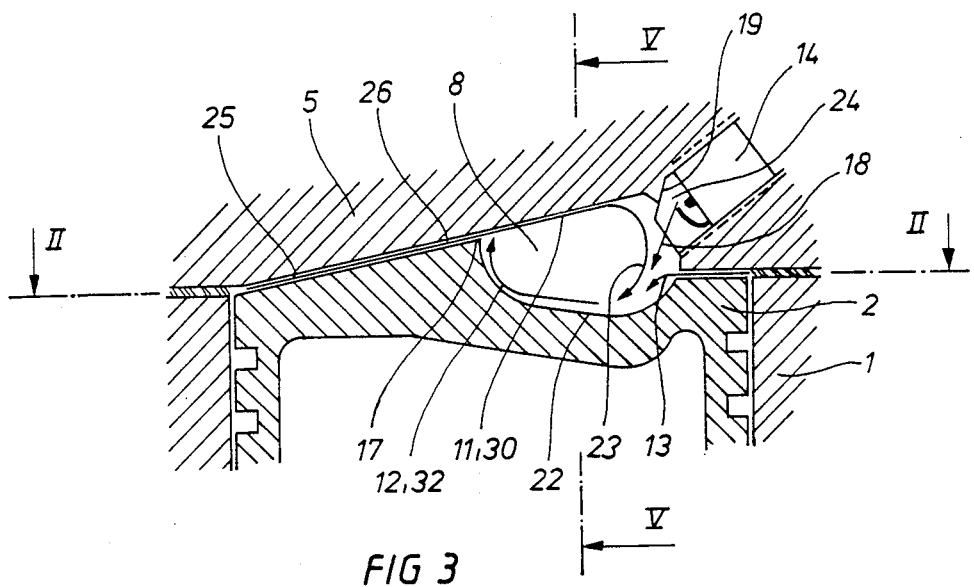
FIGS. 3 is section through the combustion chamber in accordance with FIGS. 1 and 2 at the level of line A-B.

This flow is directed in arrow direction (23)(Ref. FIG. 3) to the recess (22) in the piston head (15) and is diverted there in the direction of arrow (12) so that it flows along the floor of the recess (22).

This fast-rotating flow along the floor of the recess (22) is diverted by the guide surface (20) of the guide projection (16) and is again always diverted in the direction of the cylinder head (5).

In the combustion chamber (8) a fast-rotating flow in the direction of arrows (11)(12) is achieved.

In accordance with the invention, in the intermediate space between the valves a further guide projection (17) is arranged which is likewise provided with a slope (9) similar to that of the "squish" space (25) below it.

In accordance with FIG. 3 the mixture is then rapidly accelerated through the "squish" space (25) and is directed over the valves (6) (7) in the form of lateral "squish" space flows toward the spark plug (14).

In the central area of the combustion chamber these "squish" space flows reach the additional central "squish" space (26) formed by the guide projection (17) and are there further accelerated so that in the middle of the combustion chamber (8) a "squish" space flow (30) of higher speed arises which is directed into the spark plug in the intermediate space between the valves (6)(7).

In the central area of the combustion chamber (8) therefore, a rotating "squish" space (30) is created which impinges at high speed on the opposingly arranged spark plug (14) and is directed in the direction of arrow (25) on the guide curve (4) of the cylinder head wall (3).

An improved effect is achieved if the spark plug (14) is arranged in a chamber (24) into the cylinder head wall (3) which is recessed relative to the combustion chamber (8). The direction of the chamber (24) must be so arranged that the ignition jet (18) emerging from the chamber (24) is introduced approximately parallel to the "squish" space flow (30) flowing past in the direction of arrow (23).

This is achieved in the embodiment example shown in FIG. 3 in that the upper edge (19) of the chamber (24) lies approximately parallel to "squish" space flow (30) flowing past in arrow direction (23) thus ensuring a rapid through-ignition of the mixture.

Figure 5:
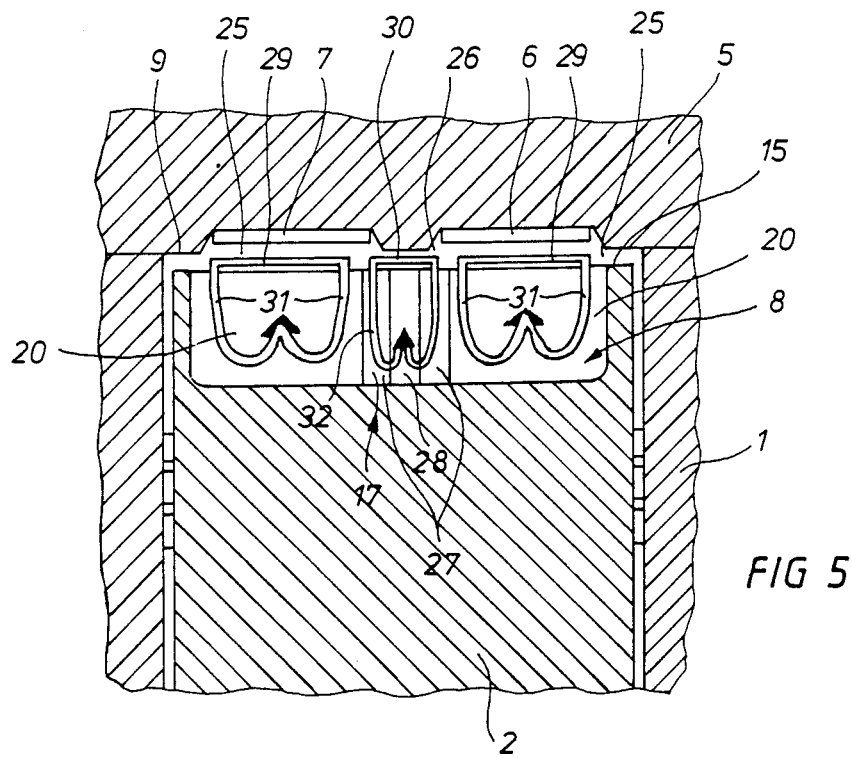
FIG. 5 is section in accordance with line V—V through the combustion chamber in FIG. 3.

FIG. 5 shows a front face view of the piston head illustrating the central guide projection (17).

It is seen here that the flow vortices (31) flowing from both lateral "squish" spaces (25) are rotating whereas the "squish" space flow formed by the central "squish" space (26) forms a fasterrotating vortex which impinges, as described, on the spark plug (14) opposite to it.

It is preferred here that the central guide projection (17) extends in the form of a wedge into the intermediate space (21) between the valves (6)(7). In accordance with FIG. 5, the guide projection (17) has a central face (28) joining onto the sides of which, at an angle, are wedge faces (27) which always pass over the guide projection (16) joining on to the sides of it.

Figure 4:
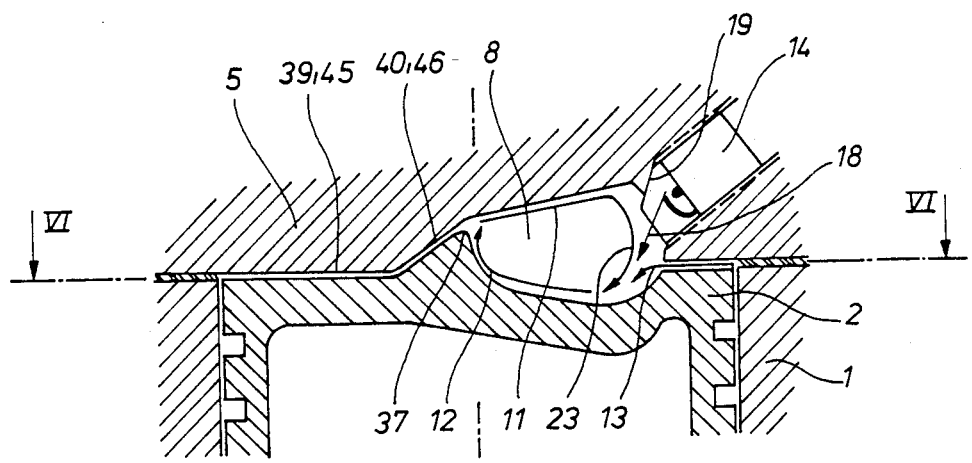
FIG. 4 is section through another embodiment example of a combustion chamber corresponding to the line 1V—1V in FIG. 6.
Figure 6:
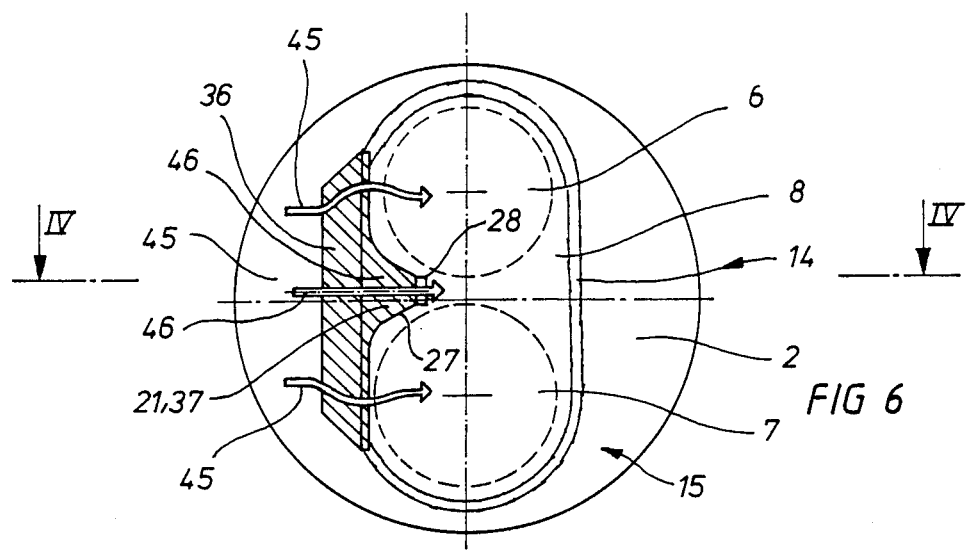
FIG. 6 is section in accordance with line V1—V1 in FIG. 4 with the position of the valves and spark plug shown by dotted lines.

In FIGS. 4 and 6, in a further embodiment example, another combustion chamber is shown in which the outer "squish" spaces (45) form an angle relative to the central "squish" space (46). The outer "squish" spaces (45) here form outer "squish" space flows (39) which, as described, rotate slower than the central "squish" space flow (40) created by the "squish" space (46).

In accordance with FIG. 6 a central guide projection (37) again extends into the intermediate space between the valves (6)(7) which always passes over the guide projection (36) joining it on the sides.

Figure 2:
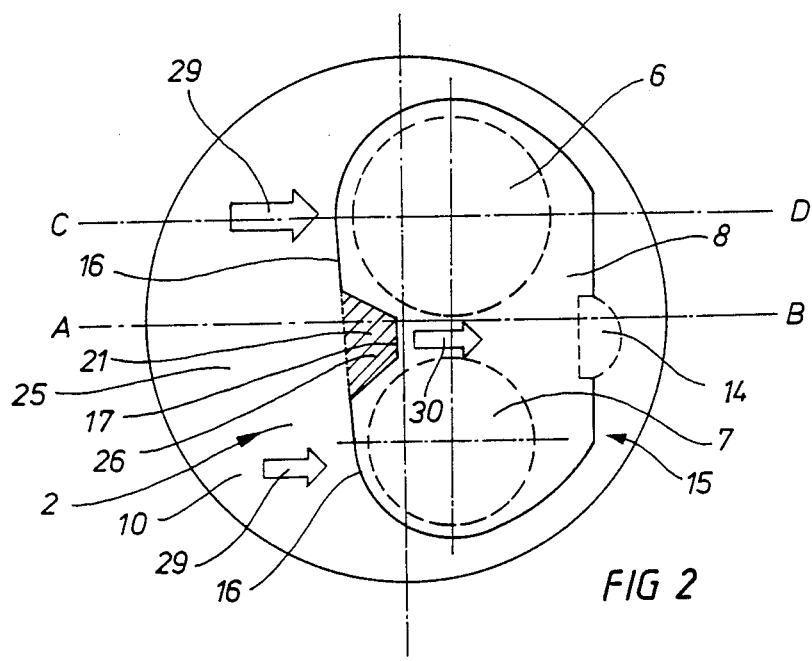
FIG. 2 is a plan view of the piston head with a section corresponding to the line 11—11 in FIG. 3 with the position of the valves and spark plug shown by dotted lines.
Figure 7:
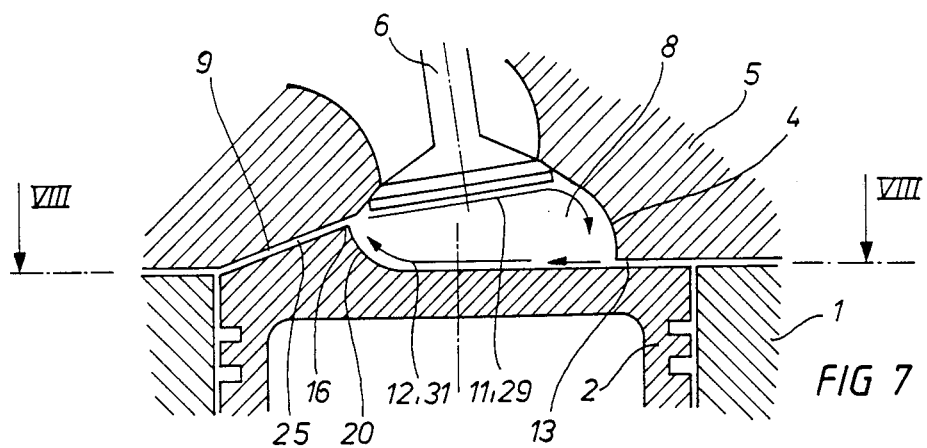
FIGS. 7 to 9 depict a modified form of combustion chamber as compared to that illustrated in FIGS. 1 to 3.
Figure 8:
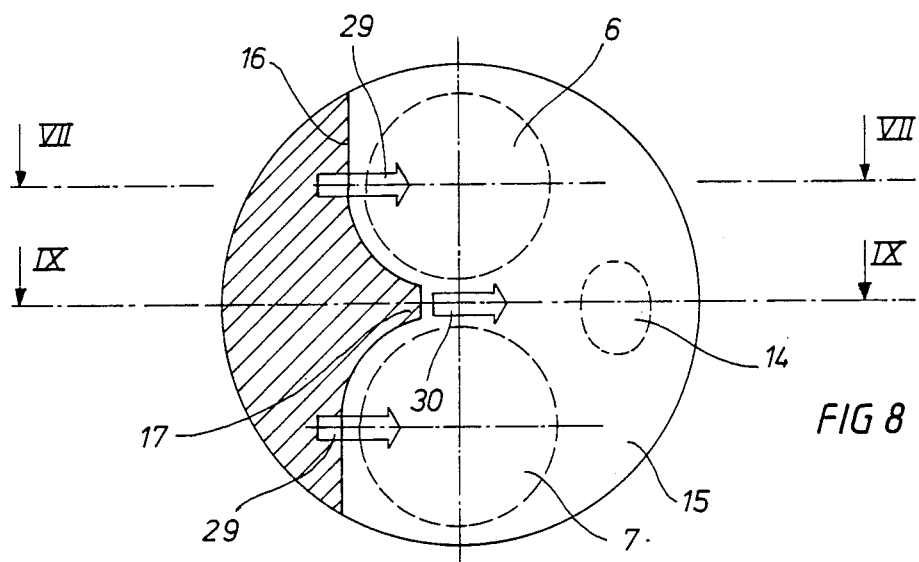
Figure 9:
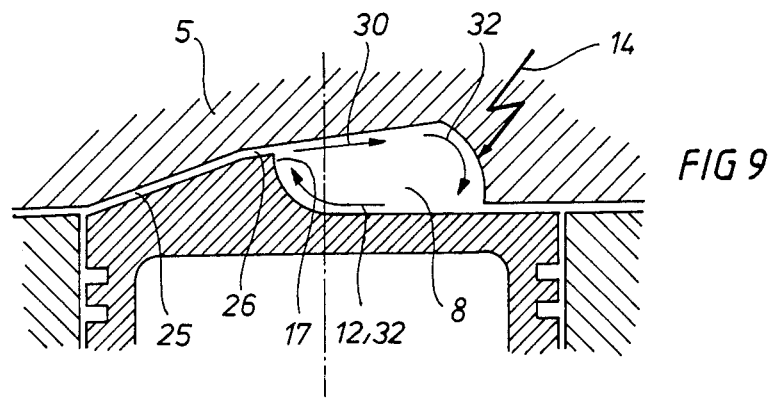

In the embodiment example shown in FIGS. 7 to 9 the index numbers are the same as those in FIGS. 1 to 3 for the same parts. The views are also mainly the same as those shown in FIGS. 1 to 3. A differentiating feature of this embodiment example is that the trough-shaped recess (22) in the piston head (15) is dispensed with. The piston head (15) is flat in the area of the combustion chamber (8) and forms, for example, one plane with the right "squish" space (13). In accordance with the description of FIGS. 1 to 3 the previously-described features and advantages are achieved again by the creation of a central "squish" space flow (30) which is laterally limited by the "squish" space flow (29).

By means of the inventive technical teaching it is therefore possible to retard the ignition timing thus reducing the temperature peaks and, additionally, the oxides of nitrogen content of the exhaust. Temperature and nitrogen content of the exhuast are low as the very weak air fuel mixture already has an air excess of 30% or more which maintains a low burning temperature thus producing less oxides of nitrogen. The carbon monoxide is, as a result of the weak air fuel mixture, low and the hydrocarbons in the exhaust are minimal due to the total combustion by means of rotation. Test results show a reduction in combustion of between 15 and 20% compared with current engines.

The design is simple and economic and requires no expensive electronic or similar control.

What I claim is:

1. A combustion engine with at least one squish space between a piston (2), having a piston head (15), and a cylinder head (5), and guide means (4) (20) within a combustion chamber (8) which create a rotating flow in said combustion chamber (8), wherein an upper wall of said combustion chamber (8) is formed by said cylinder head (5), side walls of said combustion chamber (8) are formed by a cylinder (1), and on at least one side of said piston head (15) a slope (10) is arranged which, together with an opposing slope (9) of said cylinder head (5), forms a first squish space (25) which, close to a top dead-centre position of said piston (2), creates a lateral squish space flow (29) which flows into said combustion chamber (8) parallel to said upper wall of said combustion chamber (8) and forms a rotating flow by action of said guide means (4) (20), characterized in that within an intermediate space (21) of said piston head (15) extending between an intake valve (6) and an exhaust valve (7), at least one further central squish space (26) is arranged which creates a further squish space flow (30) which reinforces said lateral squish space flow (29), said combustion engine further characterized in that said central squish space (26) is formed by a wedge-shaped central guide projection (17) on said piston head (15) and said cylinder head (5), said wedge-shaped central guide projection having a flat upper surface which conforms to said slope of said cylinder head.

2. A combustion engine in accordance with claim 1, characterized in that said central squish space (26) formed by said wedge-shaped central guide projection (17) and said cylinder head (5) is of the same slope (10) as said first squish space (25).

3. A combustion engine in accordance with claim 1, characterized in that a spark plug (14) is arranged in a chamber (24) recessed back from said combustion chamber (8) and an ignition jet (18) exiting from the said chamber (24) is directed to said rotating flow in said combustion chamber (8).

4. A combustion engine in accordance with claim 1, characterized in that said central guide projection (17) has a tapering face (28) reaching into said intermediate space (21) between said intake and exhaust valves (6) (7).

5. A combustion engine in accordance with claim 1, characterized in that a floor of said combustion chamber (8) is formed by a trough-shaped recess (22) in said piston head (15).

6. A combustion engine in accordance with claim 1, characterized in that electrodes of a spark plug (14) are directed toward the direction of squish space flow from said central squish space.

7. A combustion engine in accordance with claim 1, characterized in that said upper surface of said wedge-shaped central guide projection (17) adjoins a central face (28) of said wedge-shaped central guide projection at a sharp angle.

8. A combustion engine in accordance with claim 1, 2, 3, 4, 5, or 6 characterized in that said lateral squish space flow (29) combines with a second lateral squish space flow created by a second squish space (13) to enhance said rotating flow.

* * * * *